G. SAWYER.
MACHINE FOR TRIMMING PORK.
APPLICATION FILED MAY 19, 1913.
1,083,219.
Patented Dec. 30, 1913.
2 SHEETS—SHEET 2.
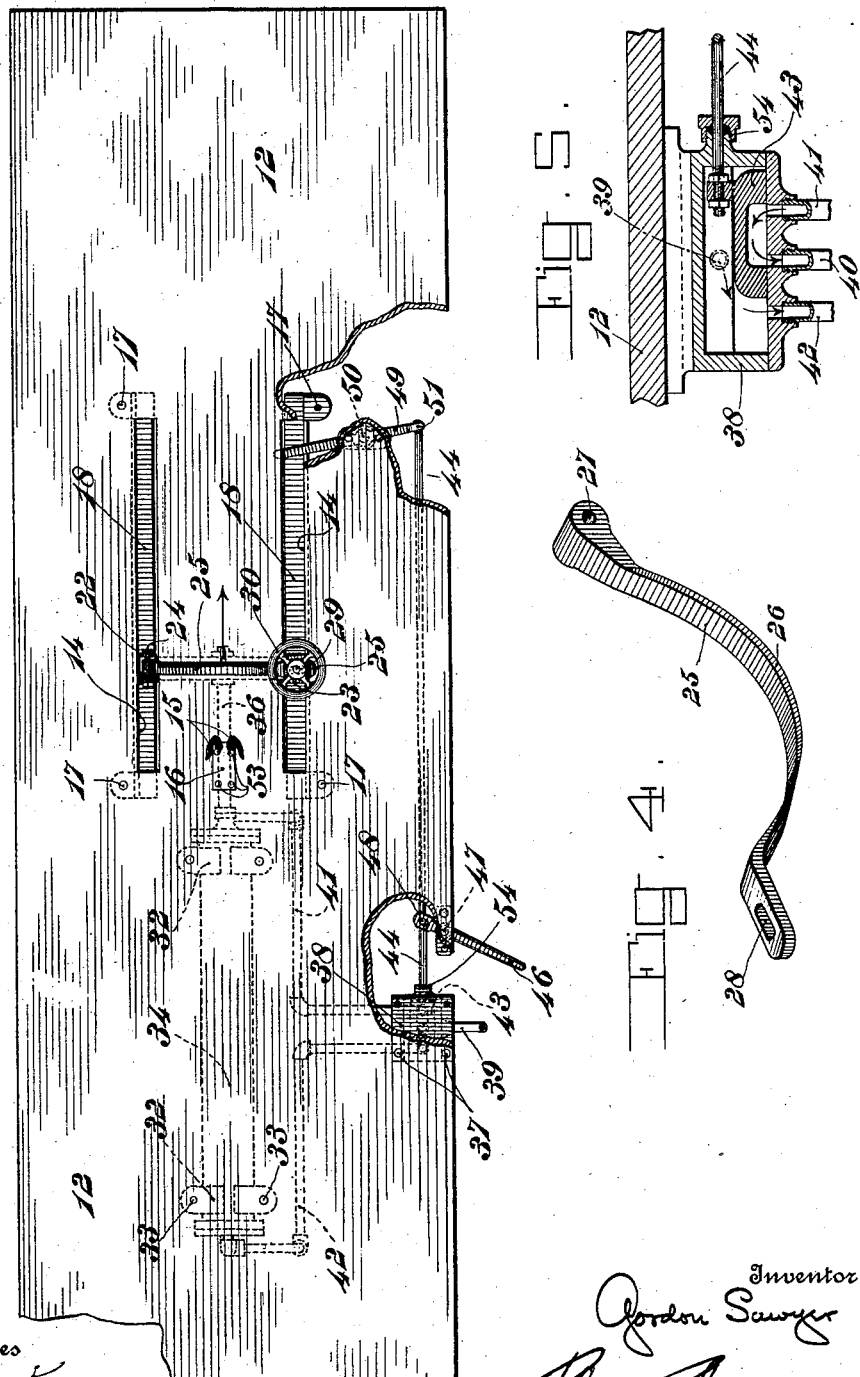

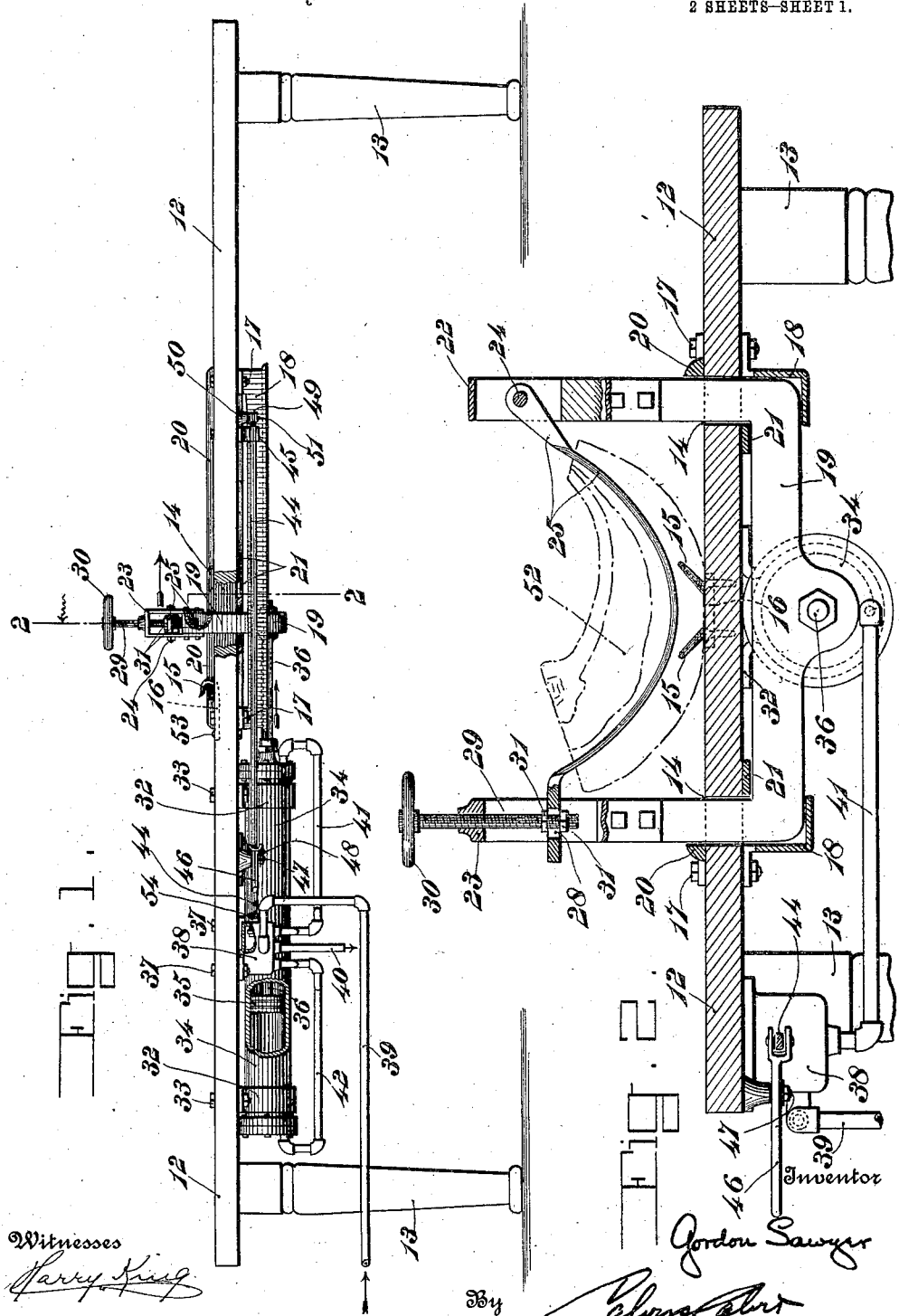

UNITED STATES PATENT OFFICE.

GORDON SAWYER, OF NASHVILLE, TENNESSEE.

MACHINE FOR TRIMMING PORK.

1,083,219.  Specification of Letters Patent.  Patented Dec. 30, 1913.

Application filed May 19, 1913. Serial No. 768,639.

*To all whom it may concern:*

Be it known that I, GORDON SAWYER, a citizen of the United States, residing at Nashville, in the county of Davidson and State of Tennessee, have invented or discovered certain new and useful Improvements in Machines for Trimming Pork, of which the following is a specification, reference being had therein to the accompanying drawings.

This invention relates to a machine for trimming meat, being more particularly designed for the purpose of trimming fat from loin pork, although obviously adapted for use for other and analogous purposes, and has for its object to provide a machine whereby the above operations may be easily and quickly performed in an efficient, uniform and reliable manner and with the expenditure of a minimum amount of manual labor. This and other objects of the invention, together with means whereby the same may be carried into effect, will best be understood from the following description of one form or embodiment thereof illustrated in the accompanying drawings. It will be understood, however, that the construction described and shown has been chosen for illustrative purposes merely and that the invention may be embodied in other forms without departing from the spirit and scope thereof.

In said drawings: Figure 1 is a side elevation, partly broken away, of a preferred form of machine embodying the invention; Fig. 2 is a transverse section substantially on the line 2—2, Fig. 1; Fig. 3 is a plan view with the table partly broken away to show parts beneath; Fig. 4 is a detail perspective view of the trimming knife. Fig. 5 is a detail sectional view of the controlling valve.

The frame of the machine comprises a bed, work support, or table 12 resting upon suitable legs or supports 13 and provided with a pair of longitudinally extending slots 14. Secured to the upper surface of the table are one or more hooks 15 for holding the meat to be trimmed in place, said hooks being preferably formed integral with a plate 16 located in a suitably formed recess in the table and secured in place therein as by bolts 53. Secured to the under side of the table, as by bolts 17, are guides 18, preferably in the form of angle bars, in which is slidably mounted a yoke or knife carrier 19 having arms projecting upwardly through the slots 14. If desired additional guide strips 20, 21 may be secured to the table adjacent the slots 14 for the purpose of steadying the movement of the arms of the yoke 19 as the latter is reciprocated in the guides 18, as hereinafter more fully described.

Secured, as by bolts, to the upper ends of the arms of the yoke 19 are brackets 22 and 23. Pivoted on a pin or bolt 24 extending between the arms of the bracket 22 is the trimming knife 25. Said knife is preferably of substantially the curved form shown most clearly in Fig. 4, having a cutting edge 26 and being provided at one end with an opening 27 to receive the bolt or pin 24 and at the opposite end with a slot 28 which receives an adjusting screw 29 in threaded engagement with the top of the bracket 23 and having at its upper end a hand wheel 30. The screw 29 carries a pair of nuts or collars 31 located on opposite sides of the end of the knife 25, so that by manipulating the hand wheel 30 the knife 25 may be swung upon its pivot 24 so as to occupy a position at a greater or less distance from the upper surface of the table 12, thereby regulating the depth of cut.

For reciprocating the yoke 19 in its guides there is provided, beneath the table 12 and suitably secured thereto, as by straps 32 and bolts 33, a fluid pressure cylinder 34 containing a piston 35 connected by a piston rod 36 with said yoke. Also secured to the table 12, as by bolts 37, is a valve casing 38 with which communicates an inlet pipe 39, an exhaust pipe 40, and pipes 41 and 42 communicating respectively with the opposite ends of the cylinder 34.

Within the valve casing 38 is a valve 43 (see Fig. 5) which may be of any usual or well known type capable of being reciprocated within the valve casing in order to place the opposite ends of the cylinder 34 alternatively in communication with the inlet and exhaust. This valve may be of any usual or well known type familiar to those skilled in the art, one suitable form being shown in detail in Fig. 5. When said valve is moved toward the right in Figs. 1 and 3 the left end of the cylinder 34 is placed in communication, through the pipe 42, with the source of fluid pressure from the pipe 39, the right end of said cylinder being at this time in communication with the exhaust 40 through the pipe 41. Similarly, when said valve is moved toward the left pressure is admitted to the right end of the cylinder 34, and the left end thereof is exhausted.

44 denotes a rod secured at one end to the valve 43, extending through a stuffing box 54 in the wall of the valve casing 38, and guided adjacent its opposite end in a bracket 45 secured to the table 12.

46 denotes a hand lever pivoted on a stud or bolt 47 projecting from the under side of the table 12 and having a forked inner end embracing the rod 44 and slotted to receive a pin 48 passing through said rod.

49 denotes a trip lever pivoted on a stud 50 projecting from the lower side of the table 12 and having its inner end extended across one of the slots 14 and consequently into the path of movement of the corresponding arm of the yoke 19. The outer end of the lever 49 is forked to embrace the end of the rod 44 and is connected therewith by a pin 51.

In operation the meat to be trimmed, shown in dotted lines and designated by the numeral 52 in Fig. 2, is placed upon the table 12 between the slots 14 and engaged by the hooks 15. At the beginning of the operation the yoke 19 and knife 25 will be at the limit of their movement toward the left in Figs. 1 and 3. The knife 25 having been adjusted by means of the screw 29 in accordance with the required depth of cut, the hand lever 46 is swung toward the left, thereby moving the valve 43 toward the right and admitting fluid pressure, preferably steam or compressed air, from the pipe 39 to the left end of the cylinder 34. The piston 35 thereupon moves toward the right and through the rod 36 carries the yoke 19 toward the right in the direction of the arrows on Figs. 1 and 3, causing the knife 25 to slice the fat from the meat 52. After said knife has completed its cutting operation one of the arms of the yoke 19 is brought into engagement with the inner end of the trip lever 49, swinging the same upon its pivot and moving the valve 43 toward the left. The left end of the cylinder 34 is thereupon exhausted and fluid pressure admitted through the pipe 41 to the right end thereof, causing the piston 35 to be moved toward the left and the yoke 19 and knife 25 to be returned to their initial position.

Having thus described my invention, I claim:

1. A machine of the character described comprising, in combination, a bed, a trimming knife, a knife carrier, said knife being pivoted at one end in said carrier, means for adjustably holding the opposite end of said knife, and means for moving said knife carrier in a direction parallel to said bed.

2. A machine of the character described comprising, in combination, a bed, a trimming knife, a knife carrier, said knife being pivoted at one end in said carrier and having at the opposite end a slot, a screw adjustably carried by said knife carrier and engaging said slot, and means for moving said knife carrier in a direction parallel to said bed.

3. A machine of the character described comprising, in combination, a work support, a knife carrier, means for relatively moving said knife carrier and work support, a trimming knife pivoted at one end in said knife carrier, and means for adjustably holding the opposite end of said knife.

4. A machine of the character described comprising, in combination, a bed, a yoke, means for moving said yoke in a direction parallel to said bed, a trimming knife pivoted at one end in one of the arms of said yoke, and means carried by the other arm of said yoke for adjustably holding the opposite end of said knife.

5. A machine of the character described, comprising, in combination, a bed having a pair of parallel slots, guides on the under side of said bed adjacent said slots, a yoke mounted in said guides and having arms extending through said slots, means for moving said yoke in said guides, a trimming knife pivoted at one end to one of said arms, and means carried by the other of said arms for adjustably holding the opposite end of said knife.

In testimony whereof I affix my signature, in presence of two witnesses.

GORDON SAWYER.

Witnesses:
 WM. F. JACOBS,
 JOHN WILKES.

Copies of this patent may be obtained for five cents each, by addressing the "Commissioner of Patents, Washington, D. C."